United States Patent
Imamura

(10) Patent No.: US 8,434,874 B2
(45) Date of Patent: May 7, 2013

(54) PATTERN PROJECTION LIGHT SOURCE AND COMPOUND-EYE DISTANCE MEASUREMENT APPARATUS

(75) Inventor: Norihiro Imamura, Osaka (JP)

(73) Assignee: Panasonic Corporation, Osaka (JP)

( * ) Notice: Subject to any disclaimer, the term of this patent is extended or adjusted under 35 U.S.C. 154(b) by 1107 days.

(21) Appl. No.: 12/302,432

(22) PCT Filed: May 21, 2007

(86) PCT No.: PCT/JP2007/060336
§ 371 (c)(1),
(2), (4) Date: Nov. 25, 2008

(87) PCT Pub. No.: WO2007/138904
PCT Pub. Date: Dec. 6, 2007

(65) Prior Publication Data
US 2009/0185157 A1  Jul. 23, 2009

(30) Foreign Application Priority Data

May 30, 2006  (JP) ................................. 2006-149184

(51) Int. Cl.
*G03B 21/14* (2006.01)
*G01C 1/06* (2006.01)
*G01B 11/14* (2006.01)
*G02B 27/10* (2006.01)

(52) U.S. Cl.
USPC .............. 353/69; 356/139; 356/621; 359/619

(58) Field of Classification Search .................... 353/69, 353/70, 38, 122; 356/139, 139.02, 621, 622; 359/619
See application file for complete search history.

(56) References Cited

U.S. PATENT DOCUMENTS

| 5,305,047 | A | * | 4/1994 | Hayakawa et al. | ........... 396/106 |
| 5,572,368 | A | | 11/1996 | Yokota et al. | |
| 7,412,159 | B2 | * | 8/2008 | Ichimiya | ....................... 396/104 |
| 2006/0197921 | A1 | * | 9/2006 | Kurosu et al. | .................. 353/70 |

FOREIGN PATENT DOCUMENTS

| JP | 4-43911 | 2/1992 |
| JP | 6-281854 | 10/1994 |
| JP | 9-281437 | 10/1997 |
| JP | 2000-292131 | 10/2000 |
| JP | 2001-91232 | 4/2001 |
| JP | 2001-264033 | 9/2001 |
| JP | 2005-165224 | 6/2005 |
| JP | 2005-534026 | 11/2005 |
| WO | 2004/011876 | 2/2004 |

* cited by examiner

*Primary Examiner* — William C Dowling
*Assistant Examiner* — Ryan Howard
(74) *Attorney, Agent, or Firm* — Hamre, Schumann, Mueller & Larson, P.C.

(57) ABSTRACT

A pattern projection light source is disclosed in which a light source (2a); a plurality of mask regions (5) in each of which a light-transmitting portion that transmits light from the light source therethrough is formed in a predetermined pattern; and a plurality of lenses (7) that each form an image of the predetermined pattern of the light-transmitting portion at a predetermined distance are arranged in this order. Since the pattern projection light source includes a plurality of projection optical systems each including a mask region and a lens, a compact and thin pattern projection light source can be realized. Moreover, provision of a plurality of lenses makes it possible to increase the imaging range of a pattern image. Furthermore, an image of the pattern of the light-transmitting portion can be formed clearly on the object.

12 Claims, 19 Drawing Sheets

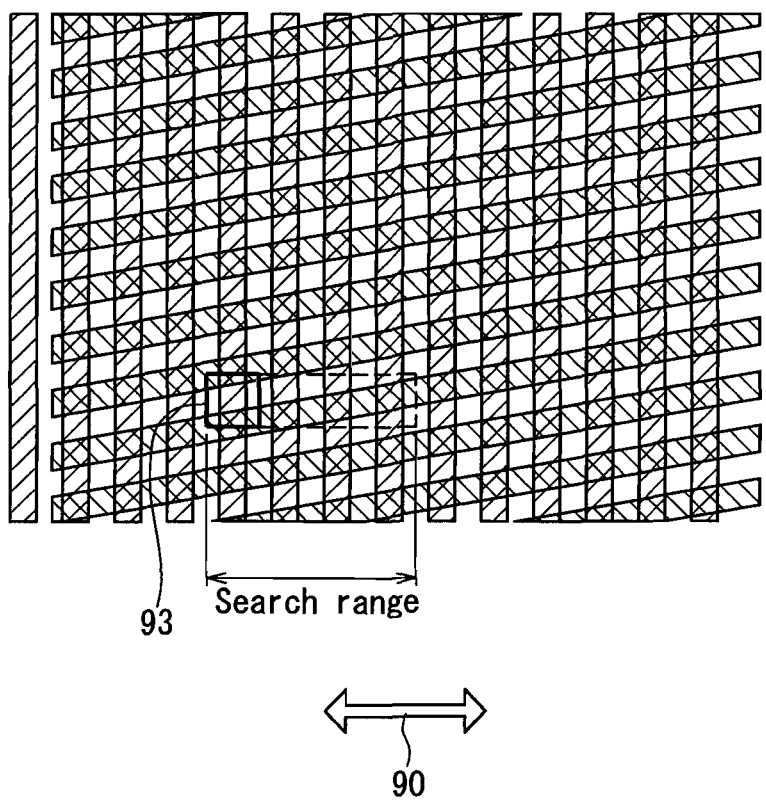

PATTERN PROJECTION LIGHT SOURCE AND COMPOUND-EYE DISTANCE MEASUREMENT APPARATUS

TECHNICAL FIELD

The present invention relates to a pattern projection light source that projects an image of a predetermined pattern onto an object. Furthermore, the invention relates to a compound-eye distance measurement apparatus that measures the distance to an object based on the parallax between a plurality of imaging optical systems.

BACKGROUND ART

Compound-eye distance measurement apparatuses that image a measurement object using two imaging apparatuses placed horizontally or vertically, and measure the distance to the object based on the parallax between two horizontally or vertically arranged images, are used for measurement of the distance between cars, autofocus systems for cameras, three-dimensional shape measurement systems, and so on. Such compound-eye distance measurement apparatuses are provided with a compound-eye optical system that forms an image of the object on an imaging element.

As one such compound-eye distance measurement apparatus, an apparatus is known that uses a horizontal (or vertical) pair of lenses to form an image of an object on a horizontal (or vertical) pair of imaging elements, respectively, thereby capturing two images (Patent Document 1).

With a compound-eye distance measurement apparatus, the parallax is extracted by pattern matching from two captured images, and the distance to a measurement object is calculated based on a principle of triangulation.

The method of pattern matching will be described with reference to FIG. 20. Numerals 91 and 92 denote a pair of images obtained using a horizontal pair of imaging optical systems. A block (small region) 91a is set in an image (standard image) 91 obtained from a first imaging optical system. A block 92a having the same y-coordinate value and the same size as the block 91a is set in an image (reference image) 92 obtained from a second imaging optical system. The sum of the finite differences (absolute values) between the luminance value of the pixels constituting the block 91a in the standard image and the luminance value of the pixels constituting the block 92a in the reference image is determined using Formula 1 below as an evaluation function SAD (Sum of Absolute Difference).

$$SAD = \sum_{i=0}^{m-1} \sum_{j=0}^{n-1} |I0(x+i, y+j) - I1(x+dx+i, y+j)| \quad \text{[Formula 1]}$$

In Formula 1, x and y are the x-coordinate value and the y-coordinate value on an imaging surface, and I0 and I1 are the luminance values of the pixels at the coordinates shown in the parentheses in the standard image and the reference image, respectively. The blocks 91a and 92a each have m (in the X-axis direction)×n (in the Y-axis direction) pixels.

The SAD is calculated while varying the movement amount dx in the base line direction (in the present example, the X-axis direction) 90 of the block 92a in the reference image 92. The value of dx with which the SAD takes a local minimum is extracted as the parallax amount with the block 91a. The movement range (search range) of the small region 92a in the reference image 92 is set according to the range of distance measurement. Since the SAD can be calculated for arbitrary coordinates in the standard image 91 by setting the block 91a in an arbitrary position in the standard image 91, it is possible to obtain the parallax amount (distance information) over the entire range of the imaging field. It is also possible to determine the parallax distribution in the standard image 91 by dividing the standard image 91 into a plurality of blocks in a matrix configuration, and carrying out the above-described pattern matching for each of the blocks.

When the distance to an object is measured using such a compound-eye distance measurement apparatus during the nighttime, it is necessary to perform imaging while irradiating the object with light using an auxiliary light source. Furthermore, for the cases where the object is of low contrast both at day and night, a technique is commonly known in which a contrast between lightness and darkness is given to the object by projecting light with a predetermined pattern onto the object using an auxiliary light source, in order to increase the accuracy of distance measurement (Patent Document 2).

Patent Document 1: JP H4-043911A
Patent Document 2: JP2001-264033A

DISCLOSURE OF INVENTION

Problem to be Solved by the Invention

Since the above-described conventional auxiliary light source for measuring the distance utilizing parallax includes a single projection optical system, it requires, for example, a light source whose output has been increased by arranging light-emitting elements in an array, or a high-output single light source, in order to provide the object with a sufficient illuminance. Moreover, in order to project light with a predetermined pattern to the measurement object, it is necessary to increase the size of a mask having a light-transmitting portion in a predetermined pattern according to the size of the above-mentioned light source, and use a large lens corresponding to the mask. Accordingly, the area of the mask is larger than the area of the imaging area of the compound-eye distance measurement apparatus, and the volume of the projection optical system that projects the pattern is thus larger than that of the imaging optical system of the compound-eye distance measurement apparatus, making it difficult to reduce the size of the distance measurement system as a whole.

Furthermore, when the focal length of the projection optical system of the auxiliary light source is larger than the focal length of the imaging optical system of the compound-eye distance measurement apparatus under the conditions in which the projection optical system of the auxiliary light source and the imaging optical system of the compound-eye distance measurement apparatus are equal in F value and angle of view, the range in which an image of a pattern is formed favorably when projecting the pattern to the object is reduced with respect to the depth of field of the imaging optical system. This results in the problem of a reduced range in which the distance to the object can be measured accurately. In order to increase the range in which the projection optical system forms an image of a pattern favorably, it is necessary to reduce the size of the diaphragm of the projection optical system; however, such a technique leads to reduced illumination efficiency, and at the same time, a reduced illuminance of the object. Accordingly, there is a problem in that the range of distance measurement is decreased for large distances.

The present invention was made in order to solve the above-described problems, and it is an object of the invention to provide a pattern projection light source that has been reduced in size and thickness and that can form an image of a pattern favorably on an object over a wide range in the direction in which the pattern is projected. It is also an object of the present invention to provide a small and thin compound-eye distance measurement apparatus that has a wide range of distance measurement, and a high accuracy of distance measurement.

Means for Solving Problem

A pattern projection light source according to the present invention includes, in this order, a light source; a plurality of mask regions in each of which a light-transmitting portion that transmits light from the light source therethrough is formed in a predetermined pattern; and a plurality of lenses that each form an image of the predetermined pattern of the light-transmitting portion at a predetermined distance.

A compound-eye distance measurement apparatus according to the present invention includes: a compound-eye distance measurement portion that measures the distance to an object based on the parallax between a plurality of imaging optical systems; and the above-described pattern projection light source according to the present invention.

Effects of the Invention

A pattern projection light source according to the present invention includes a plurality of mask regions and a plurality of lenses, and therefore can be reduced in size and thickness. Moreover, providing a plurality of lenses makes it possible to increase the imaging range of a pattern image. Furthermore, an image of the pattern of a light-transmitting portion can be formed clearly on an object.

A compound-eye distance measurement apparatus according to the present invention includes the above-described pattern projection light source of the present invention, and therefore is small in size and thickness, and has a wide range of distance measurement and a high accuracy of distance measurement.

BRIEF DESCRIPTION OF DRAWINGS

FIG. 13C is a diagram showing an image obtained by capturing images of both of the patterns of light-transmitting portions of the mask D and the mask E in the pattern projection light source according to Embodiment 2 of the present invention.

DESCRIPTION OF THE INVENTION

Figure 1:
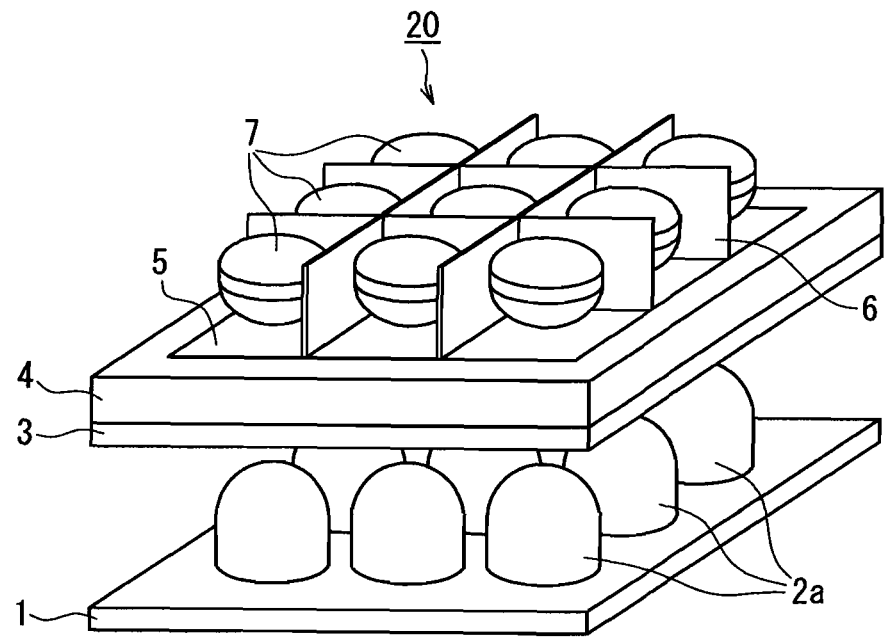
FIG. 1 is a perspective view schematically showing the configuration of a pattern projection light source according to Embodiment 1 of the present invention.

A pattern projection light source according to the present invention includes a plurality of projection optical systems that each include a mask region and a lens, and thus can be reduced in size along the optical axis (thickness) as compared with a pattern projection light source constituted by a single projection optical system.

Moreover, since providing a plurality of lenses can increase the illuminance of the object, it is possible to shorten the focal length of each lens, resulting in an increased distance range in which a pattern image is formed favorably. Accordingly, the range in which distance measurement can be carried out accurately is increased by using the pattern projection light source of the present invention as an auxiliary light source of a compound-eye distance measurement apparatus.

Furthermore, since the light source, the plurality of mask regions, and the plurality of lenses are arranged in this order, each of the lenses clearly forms an image of the pattern of the light-transmitting portion on the object. Accordingly, the distance to the object can be measured accurately by using the pattern projection light source of the present invention as an auxiliary light source of a compound-eye distance measurement apparatus.

In addition, in order to increase the light utilization, a lens may be inserted between the light source and the mask regions according to the directivity characteristics of the light source in the above-described pattern projection light source of the present invention.

In the above-described pattern projection light source of the present invention, it is preferable that the plurality of lenses are arranged in an array, and are molded integrally. By arranging the plurality of lenses in an array, the thickness of the pattern projection light source can be reduced. Further, by integrally molding the plurality of lenses, the precision of the optical axis of each lens can be increased with the use of a mold. This eliminates the need to adjust the optical axis of each lens, thereby increasing the ease of assembly.

In the above-described pattern projection light source of the present invention, it is preferable that at least two of the plurality of lenses each form an image of the predetermined pattern at a different distance from each other. This further increases the distance range in which a pattern image is formed favorably. In particular, it is preferable to adopt a configuration in which the distance in which a pattern image can be formed optimally is varied between lenses or between a plurality of lens groups, and the distance ranges in which a pattern image with at least a certain level of contrast ratio can be imaged, for the different lenses or different lens groups, partly overlap with each other. This makes it possible to form a pattern image favorably in a continuous and even wider distance range. Accordingly, by using the pattern projection light source of the present invention as an auxiliary light source of a compound-eye distance measurement apparatus, the range in which distance measurement can be carried out accurately is increased even further. In other words, by setting the plurality of projection optical systems such that a pattern image with a certain level of contrast ratio always can be formed in the range in which the compound-eye distance measurement apparatus can carry out distance measurement, the distance to the object always can be measured accurately using the pattern projection light source as an auxiliary light source. Note that in order to vary the distance at which a pattern image is formed, the positions of the mask regions or the lenses may be varied in the optical axis direction to achieve defocusing.

In the above-described pattern projection light source, it is preferable that the light-transmitting portions are formed in patterns that are different from each other in at least two of the plurality of mask regions. For example, when the patterns of the light-transmitting portions that are formed respectively in the plurality of mask regions each are formed of a plurality of stripes that are parallel to each other and the stripe patterns are the same, images of the stripe patterns that are projected by the plurality of lenses onto the object are distant from each other when the distance to the object is small, but they gradually move closer to each other as the distance to the object increases. That is, the variations in density of the stripe pattern images projected onto the object changes according to the distance to the object. Accordingly, depending on the distance to the object, a blank region of the object, in which no pattern image is projected, is increased. For example, in the case of the above-described pattern matching (see FIG. 20), in which an image is divided into a plurality of blocks (small regions) and the parallax is detected for each block, if such a wide blank area is generated on the object, then there will be blocks for which the parallax cannot be detected with high accuracy.

In order to avoid such expansion of the blank region, a configuration may be adopted in which the patterns of the light-transmitting portions formed in the mask regions may be varied between different projection optical systems or different projection optical system groups, thereby preventing the variations in density of the pattern image from changing even if the projection distance changes. For example, when the patterns of the light-transmitting portions formed in the mask regions are in the form of a stripe, it is preferable that the orientations of the stripes are different from each other. Alternatively, it is preferable that the patterns of the light-transmitting portions formed in the mask regions are random patterns without periodicity, and the random patterns are different from each other.

In the above-described pattern projection light source of the present invention, it is preferable that a pattern that is substantially entirely constituted by a light-transmitting portion is formed in at least one of the plurality of mask regions. This makes it possible to raise the level of the illuminance distribution across the entire region within a projection angle. Accordingly, it is possible to measure the distance to an object on which an image of a predetermined pattern of the mask regions is not formed at a dark place, by imaging the contrast of the object itself. In order to increase the illumination efficiency even further, it is preferable to change the projection optical system that includes a mask region that is substantially entirely constituted by a light-transmitting portion, so as to have a configuration suitable for performing uniform illumination (the configuration of a so-called illumination optical system).

Hereinafter, embodiments of the present invention will be described with reference to the drawings.

Embodiment 1

Figure 2:
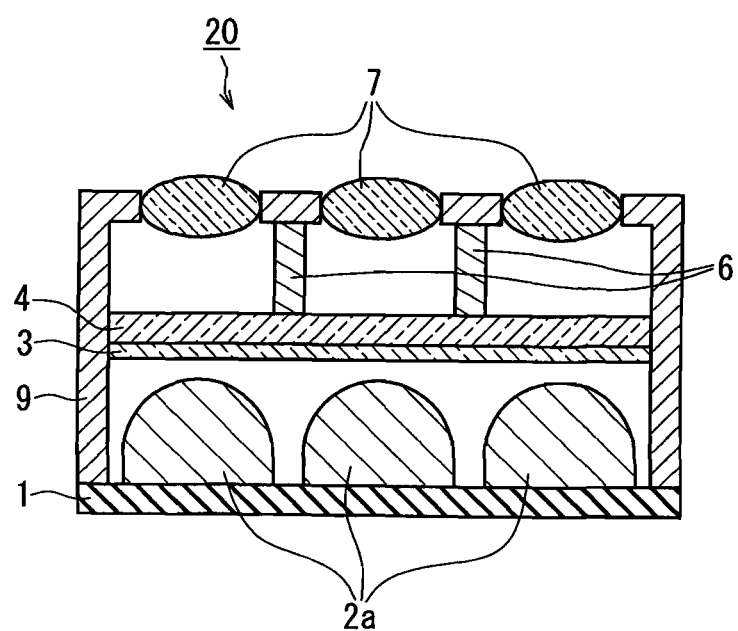
FIG. 2 is a cross-sectional view schematically showing the configuration of the pattern projection light source according to Embodiment 1 of the present invention.

FIG. 1 is a perspective view of a pattern projection light source 20 according to Embodiment 1 of the present invention. FIG. 2 is a cross-sectional view thereof. In FIG. 1, numeral 1 denotes a circuit board for mounting LEDs. A plurality of round-type LEDs 2a are arranged on the circuit board 1. Numeral 3 denotes a scattering member that scatters light beams generated from the LEDs 2a. Numeral 4 denotes a glass substrate, which includes, on its surface, a plurality of mask regions 5 in which a light-transmitting portion is formed in a predetermined pattern. Numeral 7 denotes a lens that converges light having been transmitted through the light-transmitting portion of the mask region 5, and that forms an image of the pattern of the light-transmitting portion. The light beams emitted from the LEDs 2a pass through the scattering member 3, the glass substrate 4, the mask regions 5, and the lenses 7, and then reach an object, and thereby the patterns formed in the mask regions 5 are projected. The scattering member 3 is provided to generate light beams traveling toward the pupil of the lens 7. A single mask region 5 and the corresponding single lens 7 constitute a single projection optical system. A plurality of projection optical systems are arranged vertically and horizontally in an array. The optical axes of the plurality of projection optical systems are parallel to each other. A wall 6 is provided to block the light from the adjacent projection optical system. In FIG. 2, numeral 9 denotes a lens barrel member for holding the lenses 7. In FIG. 1, illustration of the lens barrel member 9 has been omitted.

Figure 3:
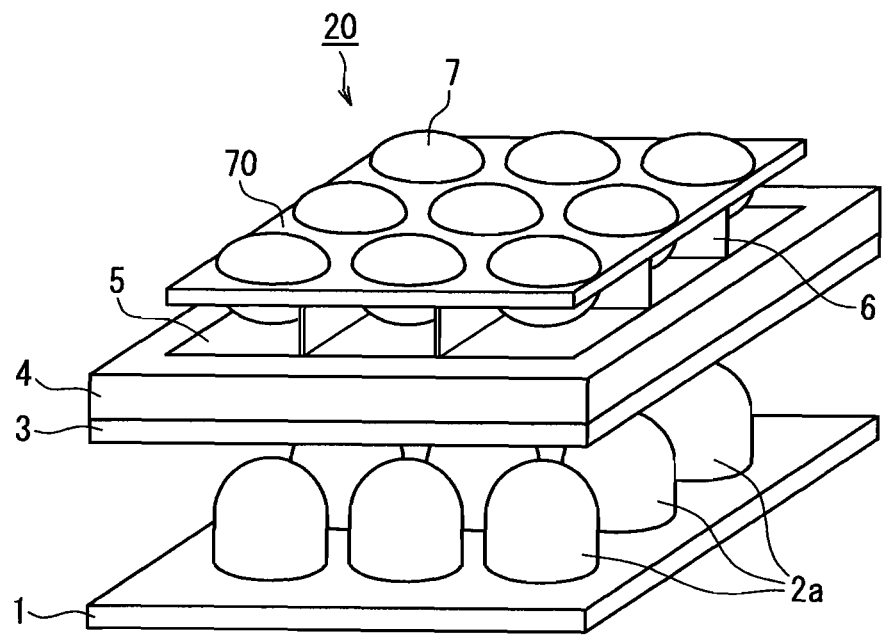
FIG. 3 is a perspective view schematically showing the configuration of another pattern projection light source according to Embodiment 1 of the present invention.

In a configuration in which a plurality of projection optical systems are arranged in an array in this manner, it is preferable to use a lens array 70 in which the plurality of lenses 7 arranged in an array are integrally molded as shown in FIG. 3. By doing so, it is possible to increase the precision of the optical axis of each of the lenses 7 with the use of a mold. This eliminates the need to adjust the optical axes of the individual lenses 7, thus increasing the ease of assembly.

It should be noted that although the LEDs 2a and the lenses 7 are in one-to-one correspondence in FIGS. 1 to 3, the present invention is not limited to this. For example, a plurality of lenses 7 (or all the lenses 7) may correspond to a single LED 2a, or a single lens 7 may correspond to a plurality of LEDs 2a. In addition, although LEDs are used as the light source, the type of the light source is not limited to this.

Although all the mask regions 5 are formed on a single glass substrate 4 in FIGS. 1 to 3, a plurality of glass substrates in each of which one or more mask regions 5 are formed may be arranged.

Figure 4:
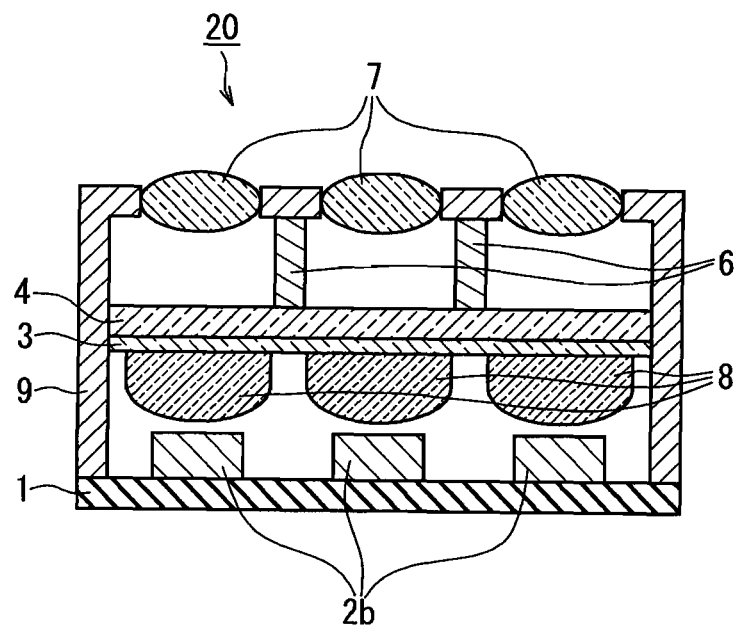
FIG. 4 is a cross-sectional view schematically showing the configuration of yet another pattern projection light source according to Embodiment 1 of the present invention.

FIG. 4 is a cross-sectional view of a pattern projection light source 20 that uses surface mount LEDs 2b as the light source, as a modification of the pattern projection light source shown in FIGS. 1 and 2. In FIG. 4, a plurality of surface mount LEDs 2b are arranged on the circuit board 1. Numeral 8 denotes a collimating lens having the function of substantially collimating light beams emitted from the LEDs 2b.

As described above, by arranging a plurality of projection optical systems in an array, the thickness and size of the pattern projection light source can be reduced as compared with a case in which a single projection optical system is used. Moreover, in the case of arranging a plurality of projection optical systems in an array, the focal length of each of the lenses 7 can be shortened as compared with a case in which only a single projection optical system is used, and therefore, the distance range in which a pattern image is formed favorably can be increased.

Next, a configuration that further increases the distance range in which a pattern image is formed favorably will be described.

Figure 5:
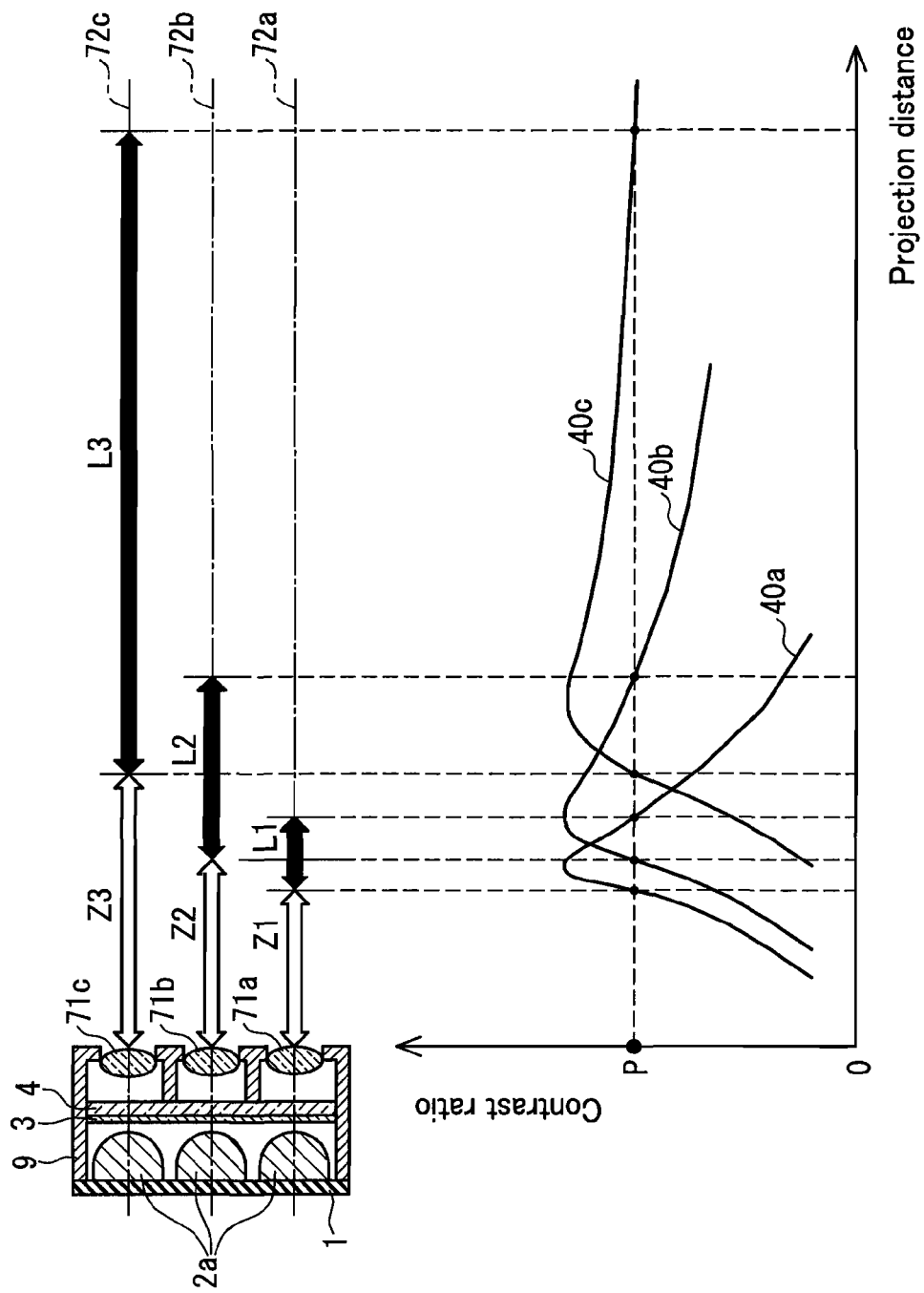
FIG. 5 shows a method for increasing the imaging range of a projection pattern in the pattern projection light sources according to Embodiment 1 of the present invention.

FIG. 5 illustrates a method for increasing the distance range in which a projected pattern image is formed favorably. In FIG. 5, numeral 71a denotes a projection lens of a first projection optical system, numeral 72a denotes the optical axis of the first projection optical system, numeral 71b denotes a projection lens of a second projection optical system, numeral 72b denotes the optical axis of the second projection optical system, numeral 71c denotes a projection lens of a third projection optical system, and numeral 72c denotes the optical axis of the third projection optical system. Of the graphs shown at the lower part of FIG. 5, numeral 40a denotes a graph showing the relationship between the projection distance of the first projection optical system and the contrast ratio, numeral 40b denotes a graph showing the relationship between the projection distance of the second projection optical system and the contrast ratio, and numeral 40c denotes a graph showing the relationship between the projection distance of the third projection optical system and the contrast ratio.

In the pattern projection light source shown in FIG. 5, the projection lenses 71a, 71b, and 71c are lenses having the same shape, and their positions in the directions of the optical axes 72a, 72b, and 72c are different from each other. This achieves relative defocusing, so that the projection distance in which a pattern image can be formed optimally can be varied between the projection optical systems. When the range in which the contrast ratio on the optical axis is greater than a predetermined value P is taken as the depth of imaging in the graphs shown in FIG. 5, the depth of imaging of the first projection optical system is L1, the depth of imaging of the second projection optical system is L2, and the depth of imaging of the third projection optical system is L3, and the imaging ranges of the first to third projection optical systems are Z1 to Z1+L1, Z2 to Z2+L2, and Z3 to Z3+L3, respectively. As shown in FIG. 5, when the imaging ranges of the first to third projection optical systems are relatively shifted such that they overlap each other, at least one pattern image that can be always formed favorably is present in the distance range Z1 to Z3+L3. Accordingly, in the case of using this pattern projection light source as an auxiliary light source of a compound-eye distance measurement apparatus, it is possible to increase the distance range in which distance measurement can be performed with high accuracy.

Shifting of the imaging ranges of the projection optical systems also can be achieved by a method in which the mask regions 5 are shifted in the optical axis direction, as well as by the above-described method in which the lenses are shifted in the optical axis direction.

Since the imaging ranges of the projection optical systems are shifted also by the ambient temperature, it is desirable to set the imaging ranges of the projection optical systems taking the operating temperature range into consideration.

Embodiment 2

The basic configuration of a pattern projection light source of Embodiment 2 of the present invention is the same as that shown in FIGS. 1 and 2 in Embodiment 1. In the present invention, the patterns of the light-transmitting portions formed in the plurality of mask regions 5 are different from each other.

Prior to description of the present embodiment, a case will be described where the patterns of the plurality of mask regions 5 are the same.

Figure 6:
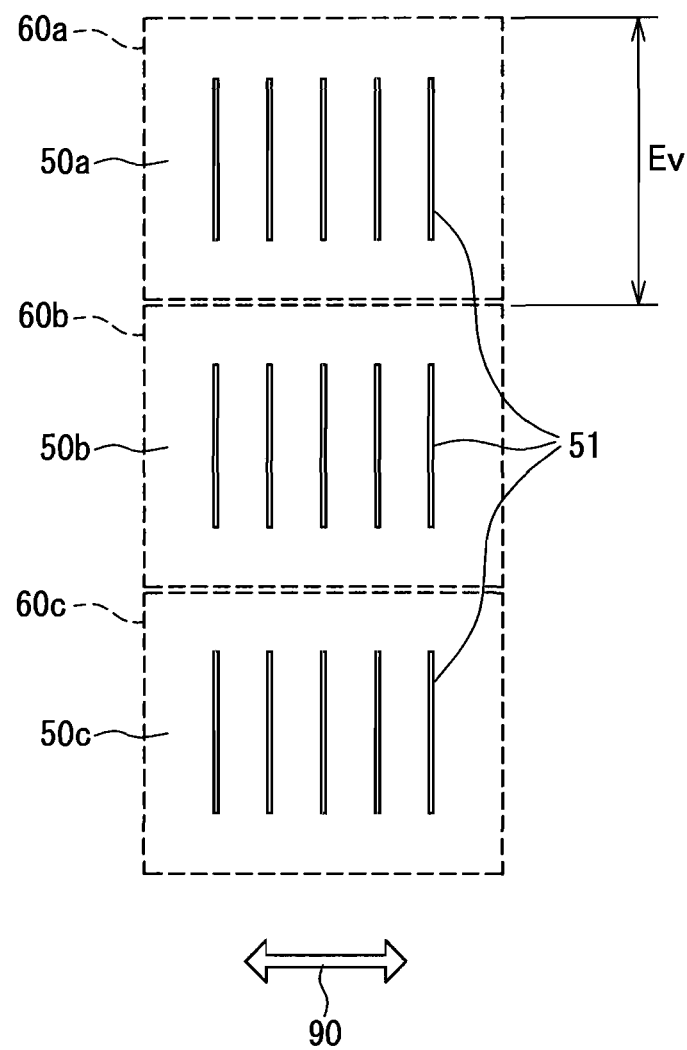
FIG. 6 is a diagram showing an example of the patterns of light-transmitting portions formed in mask regions of a pattern projection light source according to the present invention.

FIG. 6 shows three mask regions 50a, 50b, and 50c that are arranged in an array. As shown in FIG. 6, the patterns of light-transmitting portions 51 of the mask regions 50a, 50b, and 50c are the same, and they are formed of a plurality of stripes extending perpendicularly to the base line direction 90 of distance measurement. Three projection optical systems including the three mask regions 50a, 50b, and 50c are arranged perpendicularly to the base line direction 90. The mask regions 50a, 50b, and 50c are referred to as "mask A", "mask B", and "mask C", respectively. Broken lines 60a, 60b, and 60c are imaginary lines indicating the outer edges of the masks A, B, and C. Ev denotes the pitch with which the projection optical systems are arranged.

Figure 7:
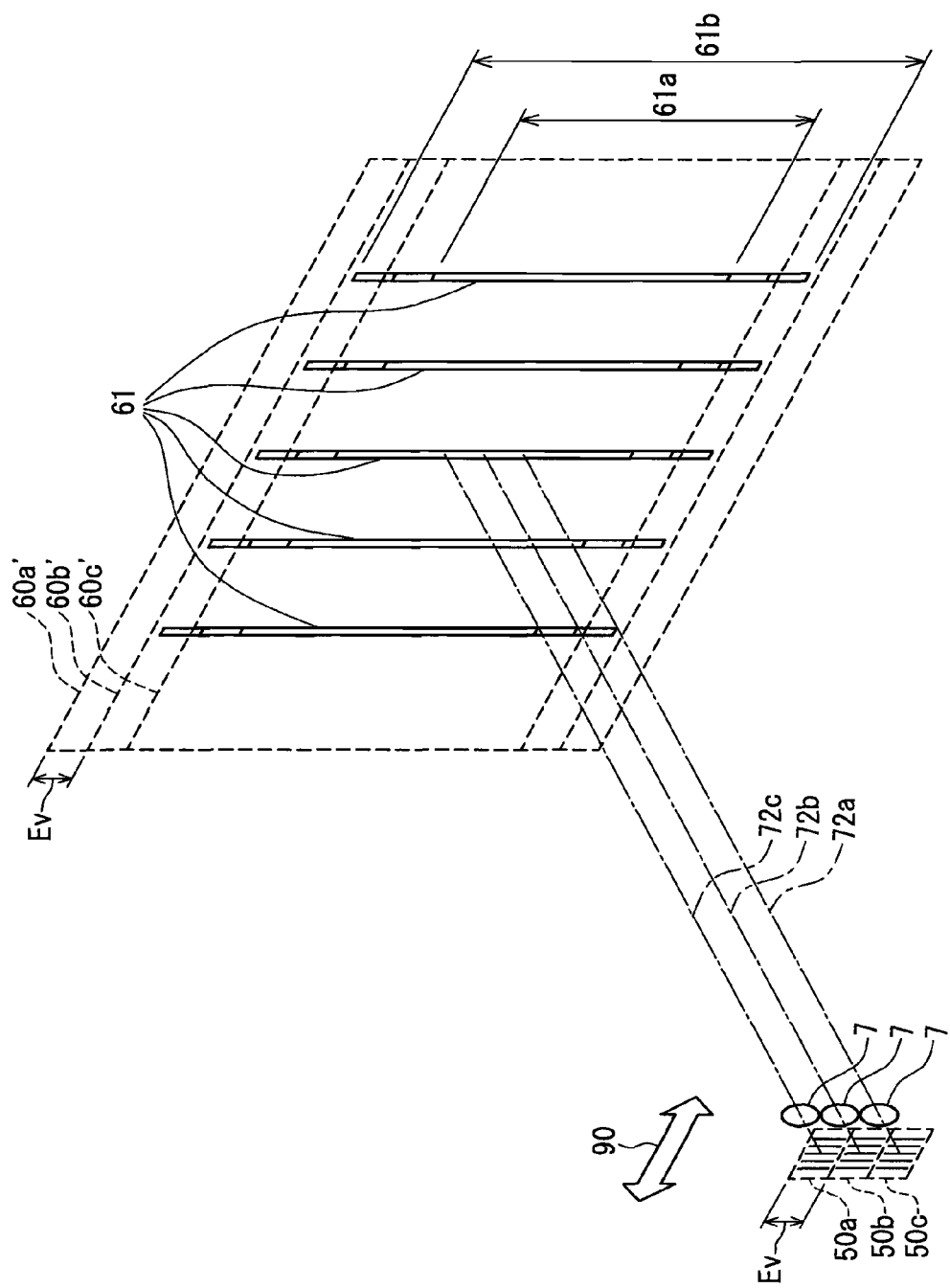
FIG. 7 is a perspective view showing how a pattern projection light source according to the present invention projects the patterns shown in FIG. 6.

FIG. 7 is a diagram illustrating how images of the patterns of the mask A, the mask B, and the mask C described above are formed on a projection surface provided at a predetermined distance. In FIG. 7, numeral 61 denotes projected images of the patterns of the light-transmitting portions 51. Here, broken lines 60a', 60b', and 60c' indicate imaginary lines indicating the positions in which the imaginary lines 60a, 60b, and 60c, which indicate the outer edges of the masks A, B, and C, are projected. While the size of the stripe-like pattern images 61 increases with an increase of the projection distance, the pitch of the imaginary lines 60a', 60b', and 60c' is always constant, and coincides with Ev. Accordingly, as the projection distance increases, the ratio of the region (intersection region) 61a in which the three pattern images 61 of the masks A, B, and C overlap to the region (union region) 61b in which any of the three pattern images 61 is formed increases. In such a mask configuration, the range of distance measurement may be set in the region in which the three pattern images 61 overlap.

Figure 8:
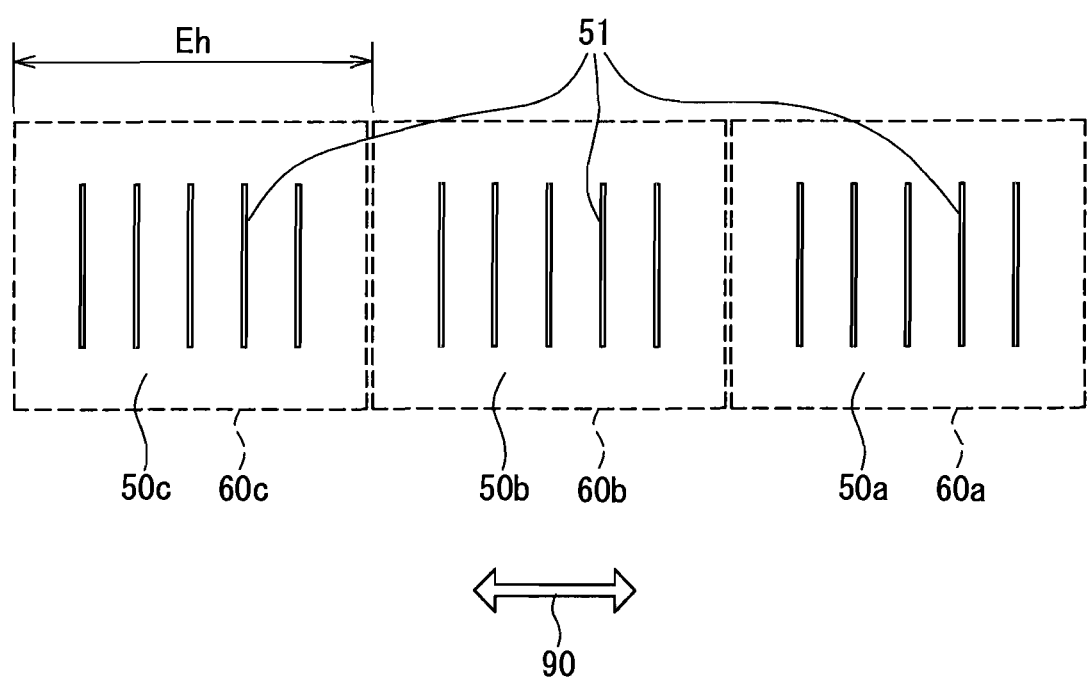
FIG. 8 is a diagram showing another example of the patterns of light-transmitting portions formed in mask regions of a pattern projection light source according to the present invention.

Next, a case as shown in FIG. 8 is considered in which three projection optical systems including three mask regions 50a, 50b, and 50c (referred to, in this order, as "mask A", "mask B", and "mask C") are arranged parallel to the base line direction 90 of distance measurement. In the mask A, the mask B, and the mask C, the same plurality of stripe-like light-transmitting portions 51 as those shown in FIG. 6 are formed perpendicularly to the base line direction 90.

Figure 9:
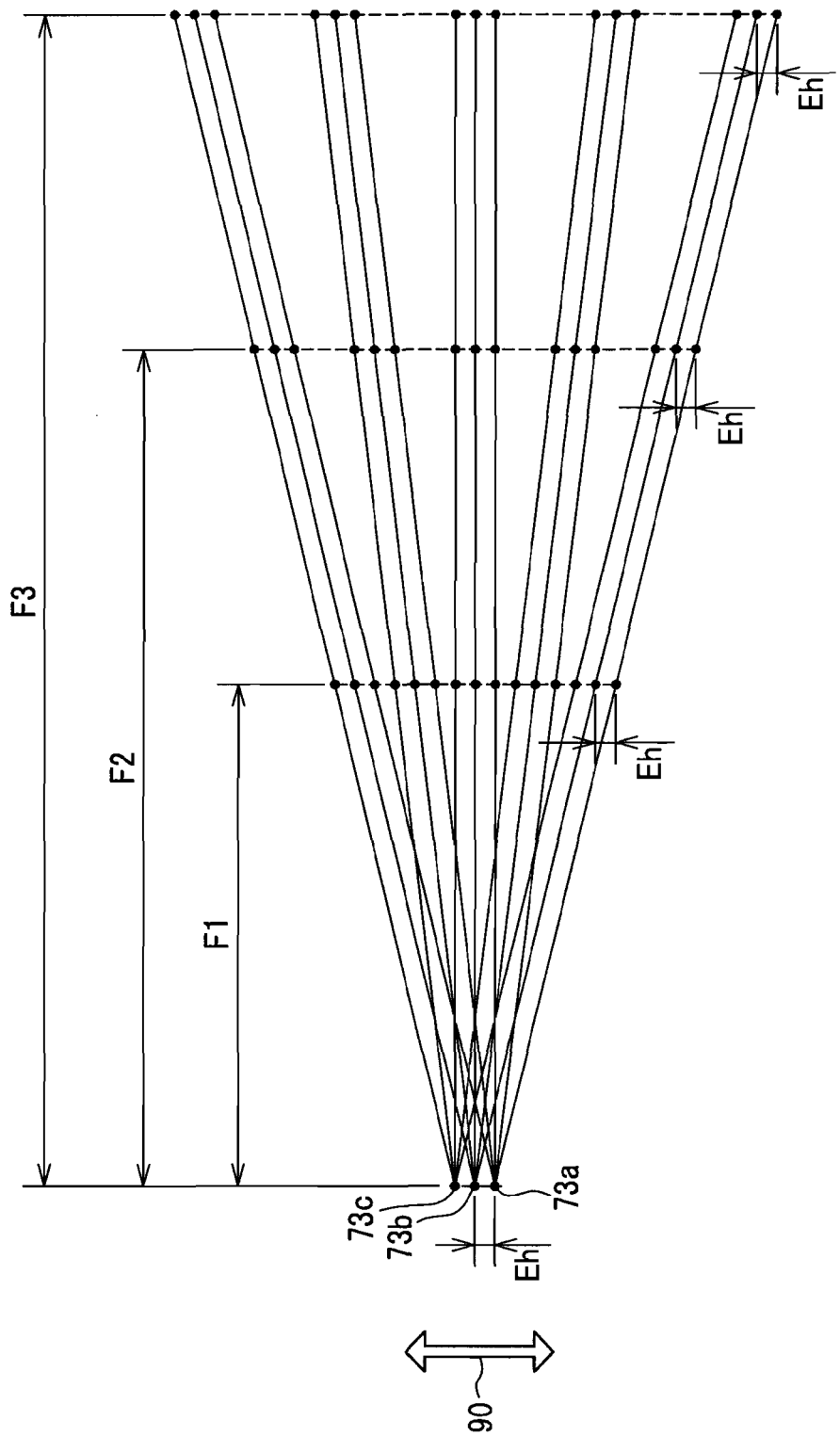
FIG. 9 shows light beams when a pattern projection light source according to the present invention projects the patterns shown in FIG. 8.
Figure 10A:
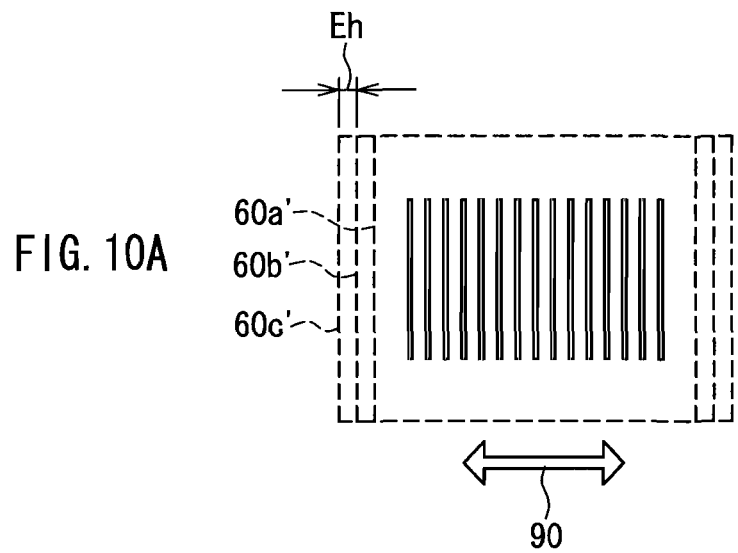
FIG. 10A is a diagram showing an image of the patterns of light-transmitting portions that are projected onto a projection surface located at distance F1 in FIG. 9.
Figure 10B:
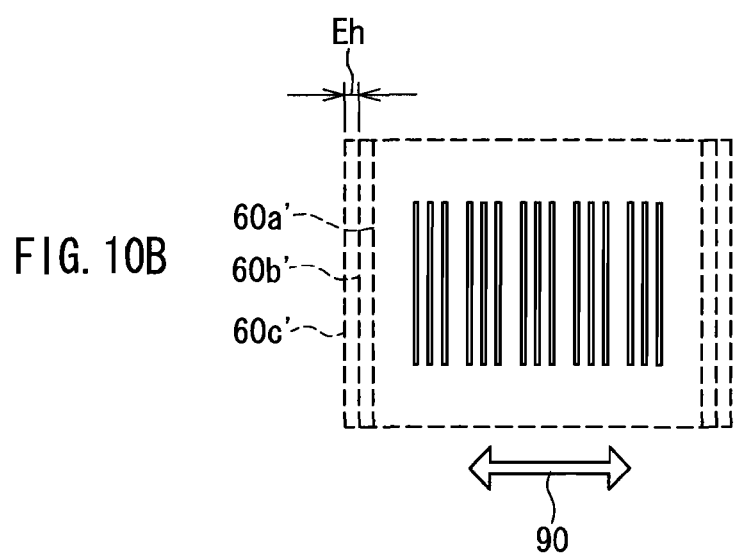
FIG. 10B is a diagram showing an image of the patterns of light-transmitting portions that are projected onto a projection surface located at distance F2 in FIG. 9.
Figure 10C:
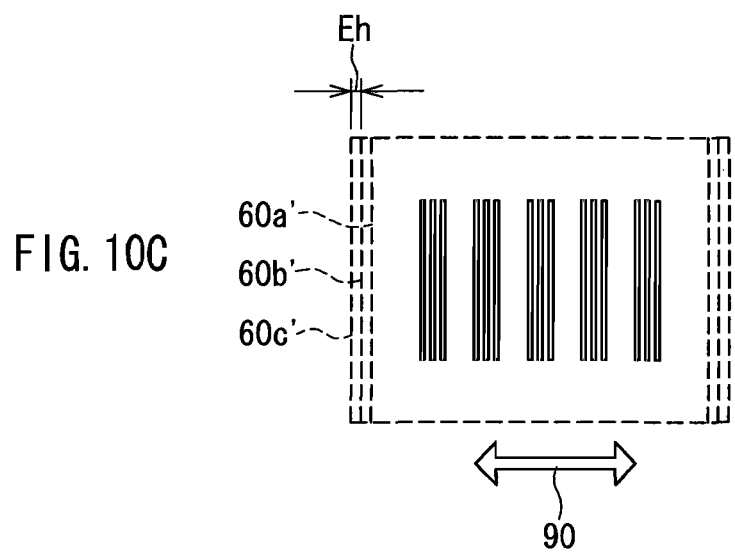
FIG. 10C is a diagram showing an image of the patterns of light-transmitting portions that are projected onto a projection surface located at distance F3 in FIG. 9.

FIG. 9 shows the optical paths of the light beams that have passed through the respective light-transmitting portions 51 of the mask A, the mask B, and the mask C. In FIG. 9, dots 73a, 73b, and 73c indicate, in this order, projection optical systems that include the mask A, mask B, and mask C shown in FIG. 8. In FIG. 9, images of the patterns of the light-transmitting portions 51 that are formed on planes of projection located at distances F1 and F2, and F3 are formed at intersection points of the straight lines indicating the light beams that have passed through the light-transmitting portion 51 and the broken lines indicating the planes of projection. Accordingly, images of the patterns of the light-transmitting portions 51 at the distances F1, F2, and F3 will be, in this order, as shown in FIG. 10A, FIG. 10B, and FIG. 10C. Here, broken lines 60a', 60b', and 60c' indicate imaginary lines indicating the positions in which imaginary lines 60a, 60b, and 60c, which indicate the outer edges of the masks A, B, and C, are projected. When the projection distance to the projection surface varies, the size of an image of the light-transmitting portion 51 that is formed on the projection surface varies. However, the magnifications of FIG. 10A, FIG. 10B, and FIG. 10C are adjusted such that the size of the region surrounded by the imaginary lines 60a', 60b', and 60c' is the same between FIG. 10A, FIG. 10B, and FIG. 1C.

In FIG. 8, FIG. 9, FIG. 10A, FIG. 10B, and FIG. 10C, Eh denotes the pitch with which the projection optical systems are arranged. While the size of an image of the pattern of the light-transmitting portion 51 increases as the projection distance increases, the pitch of the imaginary lines 60a', 60b', and 60c' in the base line direction 90 is always constant, and coincides with Ev. Accordingly, as shown in FIG. 10C, the longer the projection distance is, the greater the variations in density of the pattern image are emphasized. Consequently, in the case of using, for example, a distance measurement method as described with reference to FIG. 20 in which the captured image is divided into a plurality of blocks, and distance information is obtained for each of the blocks, there may be a case in which, depending on the distance to the object, blocks in which the density of the pattern image is high and blocks in which almost no pattern image is present exist at the same time. In such a case, when a block in which a region of an object that is almost free of the contrast of the object itself is imaged coincides with a block in which almost no pattern image is present, the image information necessary for distance measurement hardly can be obtained from the former block. This may result in blocks with which distance measurement cannot be measured accurately, or blocks that cause a measurement error, thereby reducing the accuracy of distance measurement.

Figure 11:
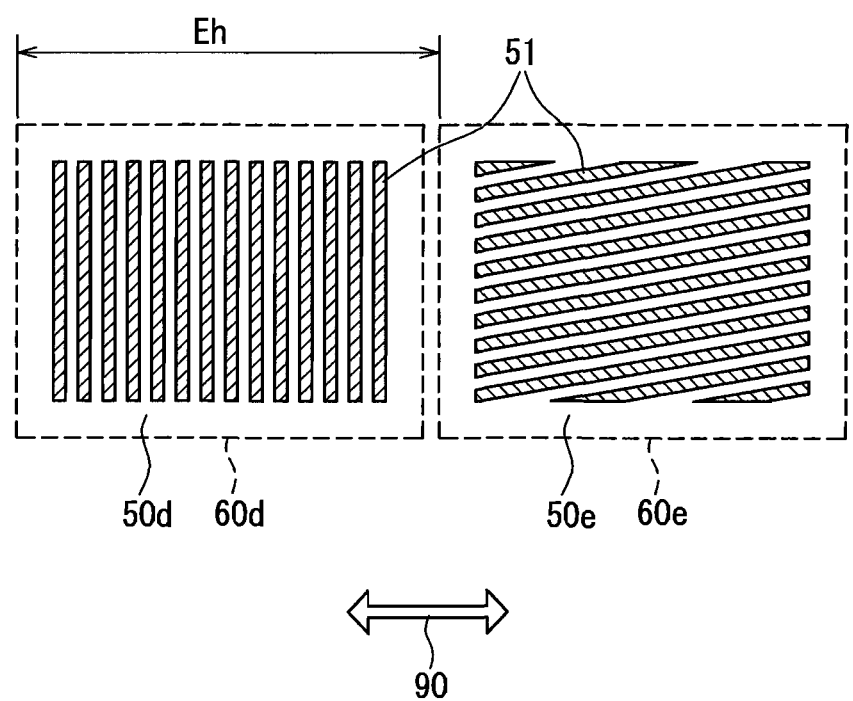
FIG. 11 is a diagram showing an example of the patterns of light-transmitting portions formed in mask regions of a pattern projection light source according to Embodiment 2 of the present invention.
Figure 12A:
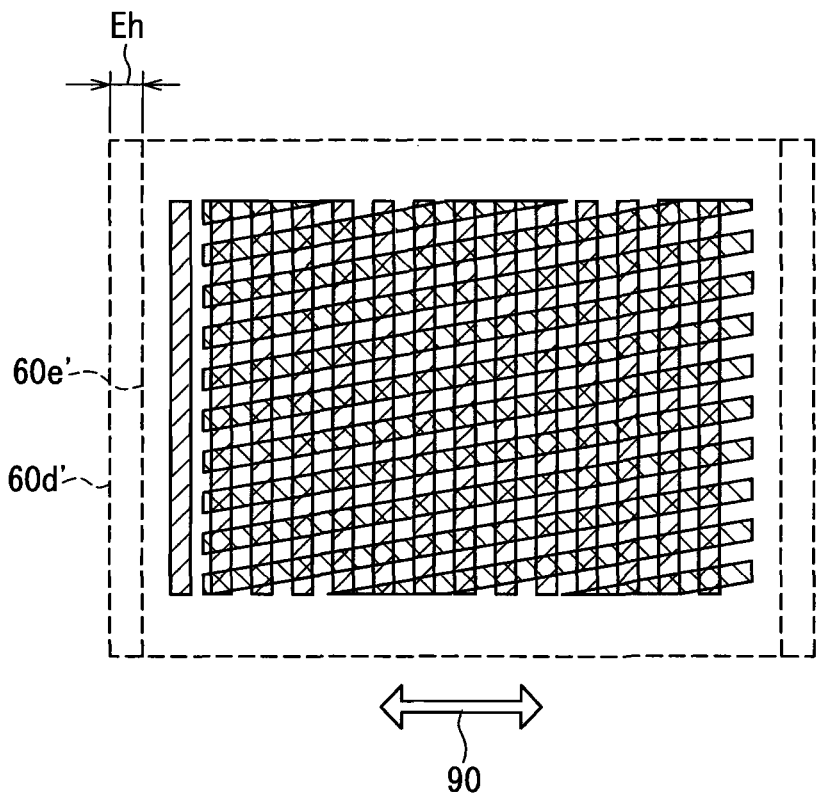
FIG. 12A is a diagram showing an image of the patterns of light-transmitting portions, shown in FIG. 11, that is projected onto a projection surface located at the distance F1.
Figure 12B:
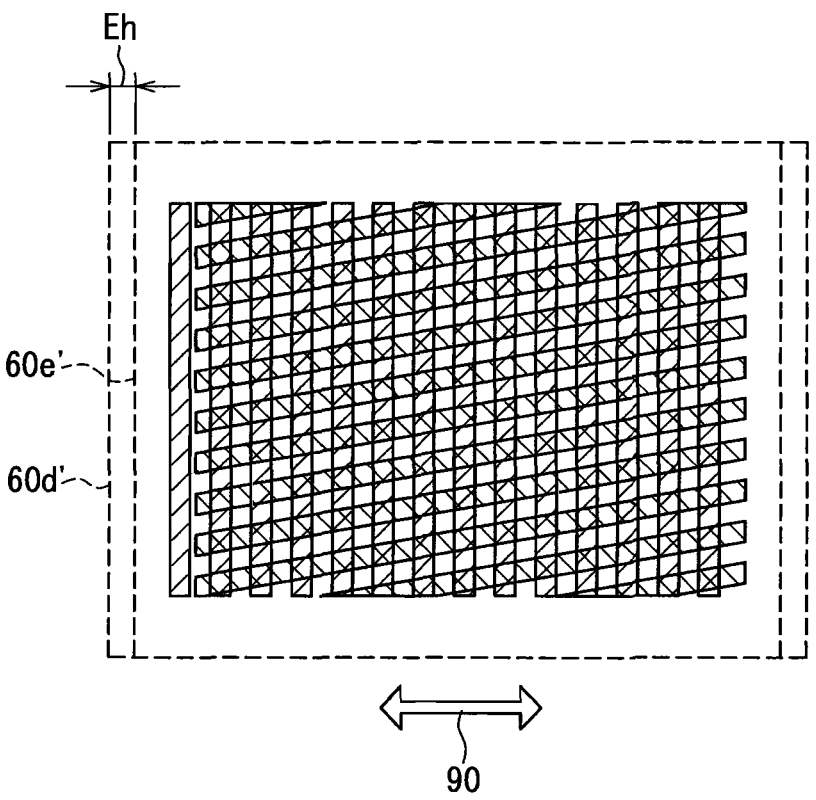
FIG. 12B is a diagram showing an image of the patterns of light-transmitting portions, shown in FIG. 11, that is projected onto a projection surface located at the distance F2.
Figure 12C:
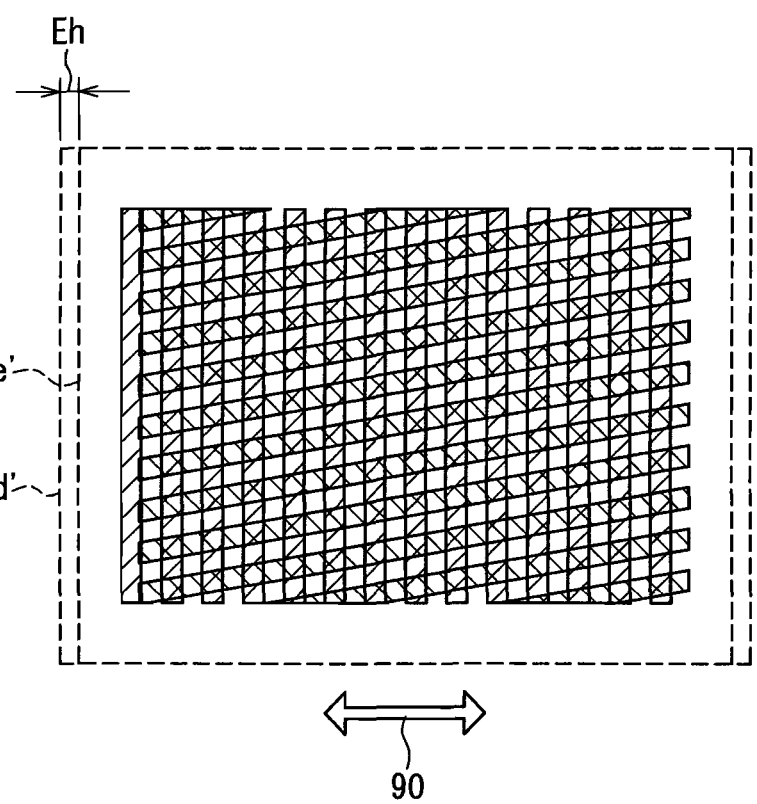
FIG. 12C is a diagram showing an image of the patterns of light-transmitting portions, shown in FIG. 11, that is projected onto a projection surface located at the distance F3.

Next, the patterns of the light-transmitting portions 51 of the mask regions according to the present embodiment will be described. FIG. 11 is a diagram showing the patterns of light-transmitting portions 51 of mask regions 50d, and 50e according to this embodiment. Two projection optical systems are arranged in an array, parallel to the base line direction 90 for distance measurement. A pattern of light-transmitting portion 51 that is made up of a plurality of parallel stripes is formed in each of the two mask regions 50d and 50e included in these two projection optical systems. Here, the orientation of the stripes varies between the mask regions 50d and 50e. The mask regions 50d and 50e are referred to as "mask D" and "mask E", respectively. Broken lines 60d, and 60e indicate imaginary lines indicating the outer edges of the masks D and E. Eh denotes the pitch with which the projection optical systems are arranged. Since the mask regions 50d and 50e include such patterns of light-transmitting portions 51, images of the patterns of the light-transmitting portions 51 formed on planes of projection located at the distances F1, F2, and F3 shown in FIG. 9 will be, in this order, as shown in FIG. 12A, FIG. 12B, and FIG. 12C. Here, broken lines 60d' and 60e' indicate imaginary lines indicating the positions in which the imaginary lines 60d and 60e, which indicate the outer edges of the masks D and E, are projected. Similarly to FIG. 10A, FIG. 10B, and FIG. 10C, the magnifications of FIG. 12A, FIG. 12B, and FIG. 12C are adjusted such that the size of the region surrounded by the imaginary lines 60d' and 60e' is the same between FIG. 12A, FIG. 12B, and FIG. 12C.

While the size of the pattern image of the light-transmitting portion 51 increases with an increase of the projection distance, the imaginary lines 60d' and 60e' are always shifted by Eh in the base line direction 90. Accordingly, as the projection distance increases, the ratio of Eh to the region surrounded by the imaginary lines 60d' and 60e' is reduced. This is the same as the cases of FIG. 10A, FIG. 10B, and FIG. 10C.

However, since the orientations of the stripe patterns of the light-transmitting portions 51 formed in the two mask regions 50d and 50e are different in this embodiment, only the intersection points of the stripe pattern images are moved when the projection distance is changed; accordingly, the variations in density of the pattern images will not change depending on the projection distance, unlike the cases shown in FIG. 10A, FIG. 10B, and FIG. 10C. Furthermore, the illuminance is greater at the intersection points of the stripe pattern images, resulting in an increased number of gradations. This means that the amount of the image information available for distance measurement is increased; accordingly, the accuracy of distance measurement can be increased as compared with when the pattern of the light-transmitting portions is the same between different mask regions.

Furthermore, the accuracy of distance measurement can be increased by appropriately setting the angle formed by the orientations of the light-transmitting portions 51 formed in the two mask regions 50d and 50e. In the following, the principle of this improvement in the accuracy of distance measurement will be described.

Figure 13A:
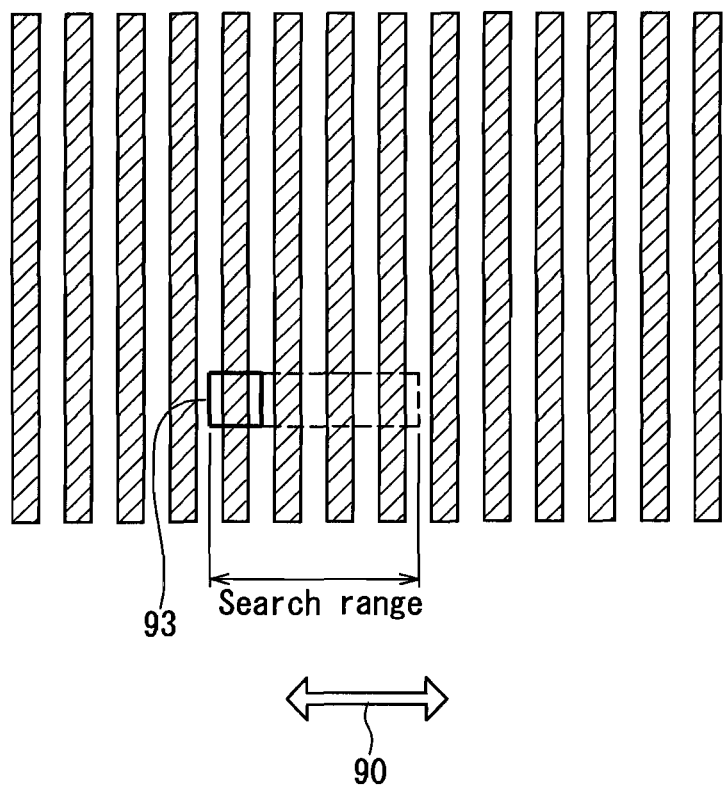
FIG. 13A is a diagram showing an image obtained by capturing only an image of the pattern of a light-transmitting portion of mask D in the pattern projection light source according to Embodiment 2 of the present invention.
Figure 14A:
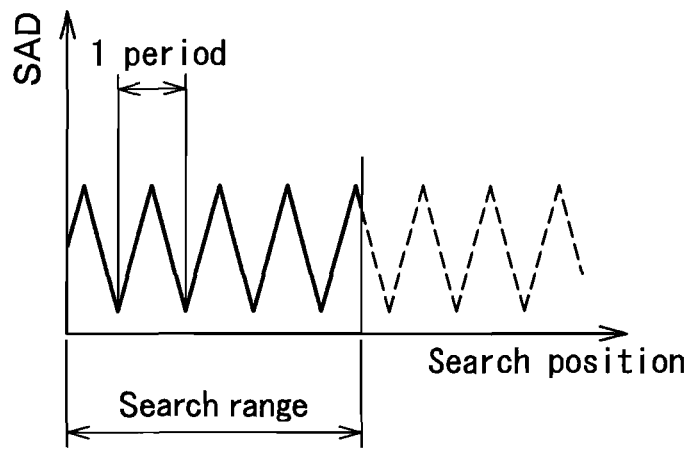
FIG. 14A is a graph showing changes in the SAD value in a search range when pattern matching is carried out using the image shown in FIG. 13A.
Figure 20:
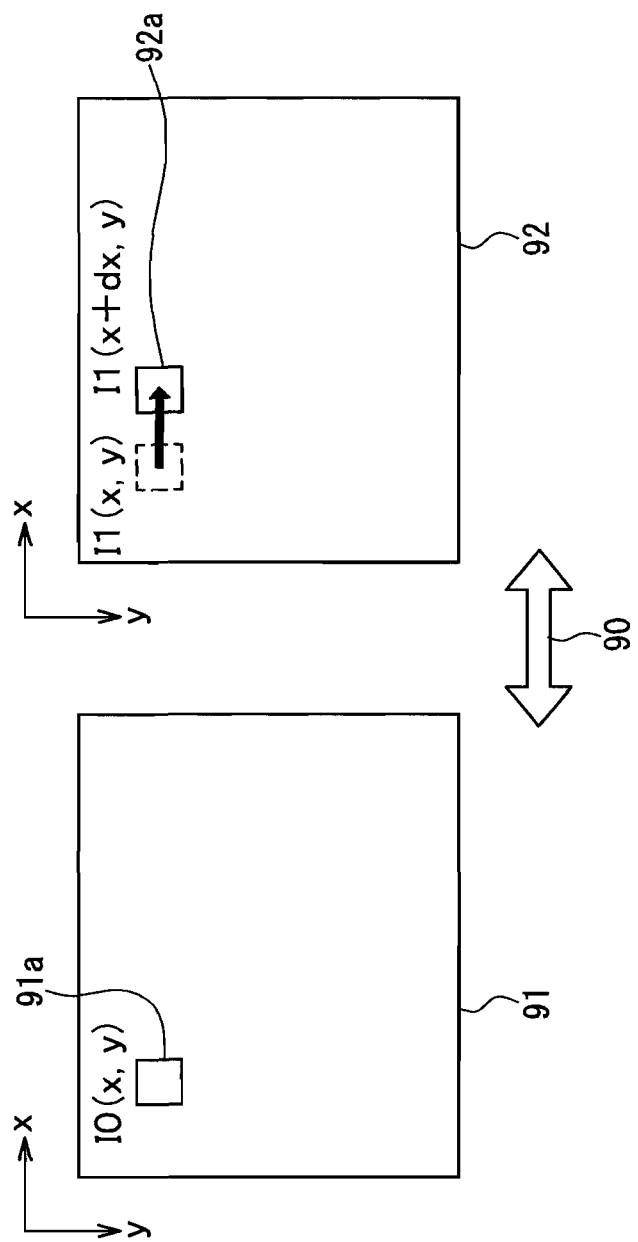
FIG. 20 is a diagram illustrating a pattern matching method performed in a compound-eye distance measurement apparatus.

FIG. 13A shows an image obtained by projecting only the stripe pattern of the light-transmitting portion 51 of the mask region 50d (mask D) shown in FIG. 11 onto a projection surface at a predetermined distance, and capturing an image on the projection surface using a compound-eye distance measurement apparatus. Using this image as a reference image, the pattern matching described with reference to FIG. 20 is carried out. The SAD is calculated while moving a block 93 shown in FIG. 13A in a direction parallel to the base line direction 90 in a search range. Since a plurality of stripe images perpendicular to the base line direction 90 are present in the search range, the SAD value changes as shown in FIG. 14A. Since a plurality of local minimums of SAD appear in the search range, and these local minimums are substantially equal, there is a possibility of erroneously detecting parallax.

Figure 13B:
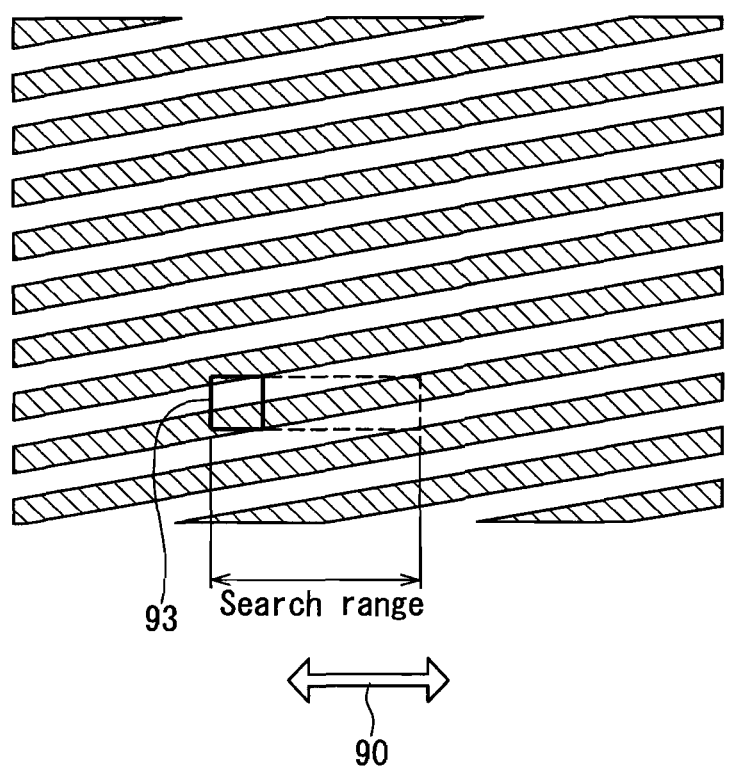
FIG. 13B is a diagram showing an image obtained by capturing only an image of the pattern of a light-transmitting portion of mask E in the pattern projection light source according to Embodiment 2 of the present invention.
Figure 14B:
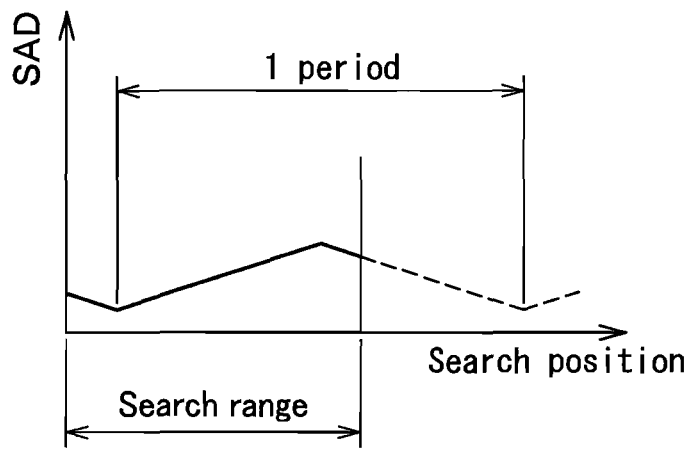
FIG. 14B is a graph showing changes in the SAD value in the search range when pattern matching is carried out using the image shown in FIG. 13B.

FIG. 13B shows an image obtained by projecting only the stripe pattern of the light-transmitting portion 51 of the mask region 50e (mask E) shown in FIG. 11 onto a projection surface at a predetermined distance, and capturing an image on the projection surface using a compound-eye distance measurement apparatus. Using this image as a reference image, the pattern matching described with reference to FIG. 20 is carried out as in the above-described case. In FIG. 13B, the image of the plurality of stripes is inclined relative to the base line direction 90 such that the period of the stripe image in the base line direction 90 is longer than the search range. Accordingly, the SAD value changes as shown in FIG. 14B. Since only one local minimum is present in the search range, parallax will not be detected erroneously. However, the change in the SAD value is gradual before and after the local minimum, so that there is a possibility that the accuracy of the pattern matching may be reduced.

When the pattern matching is performed by imaging only a single stripe pattern in this way, the problems of erroneous detection, reduced accuracy and so on may arise.

Figure 14C:
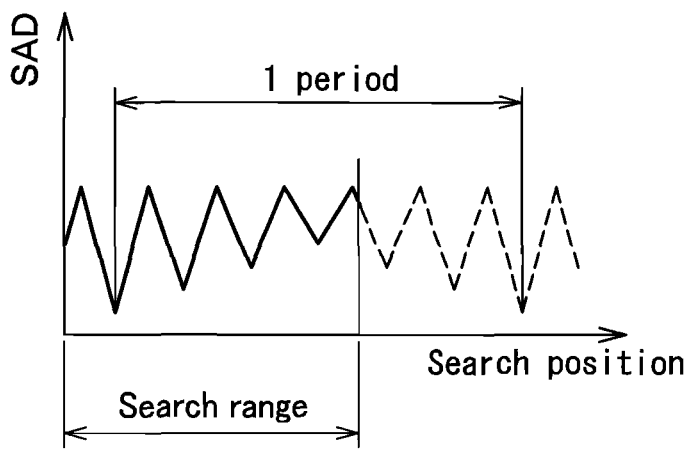
FIG. 14C is a graph showing changes in the SAD value in the search range when pattern matching is carried out using the image shown in FIG. 13C.

FIG. 13C shows an image obtained by projecting both of the stripe patterns of the light-transmitting portions 51 of the mask region 50d (mask D) and the mask region 50e (mask E) shown in FIG. 11 onto a projection surface at a predetermined distance, and capturing an image on the projection surface with a compound-eye distance measurement apparatus. Using this image as a reference image, the pattern matching described with reference to FIG. 20 is carried out as in the above-described cases. When the SAD is calculated while moving a block 93 shown in FIG. 13C in a direction parallel to the base line direction 90 in a search range, the SAD value changes as shown in FIG. 14C. That is, although a plurality of local minimums of SAD are present in the search range, the plurality of local minimums are different from each other, and only one smallest local minimum of SAD is present in the search range. Moreover, the change in the SAD value before and after the local minimums is abrupt. Accordingly, the accuracy of the pattern matching is increased, improving the accuracy of distance measurement.

Figure 15:
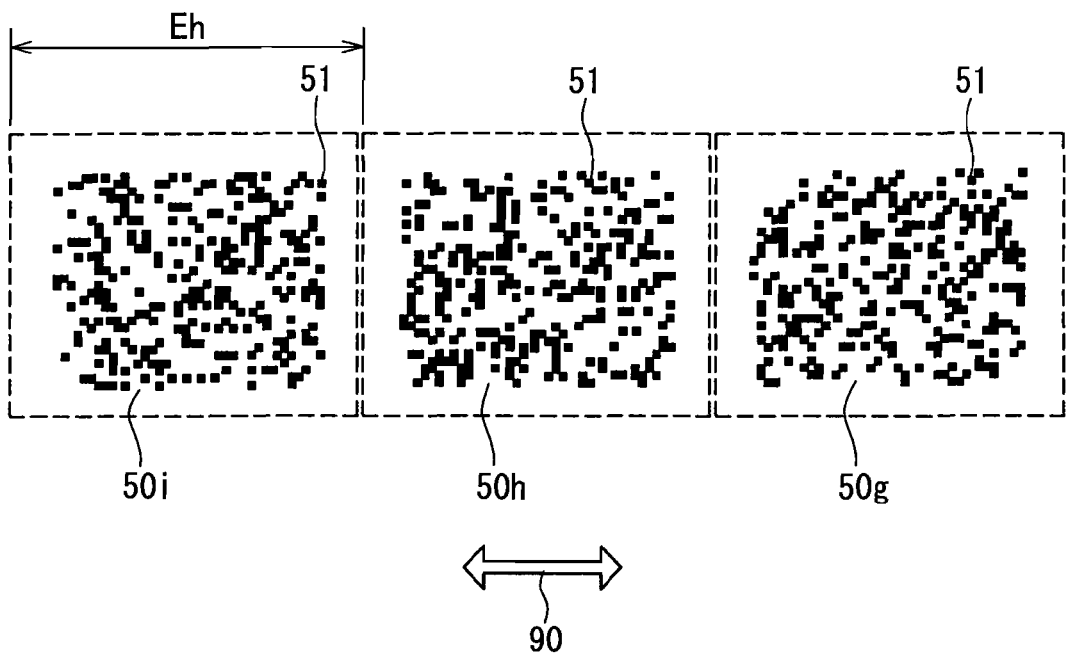
FIG. 15 shows another example of the patterns of light-transmitting portions formed in the mask regions of the pattern projection light source according to Embodiment 2 of the present invention.

In this embodiment, the patterns of the light-transmitting portions of the mask regions are not limited to those shown in FIG. 11. For example, as shown FIG. 15, different random patterns of light-transmitting portions 51 without periodicity may be formed in mask regions 50g, 50h, and 50i. Such patterns also can reduce the variations in density of images of the projected patterns depending on the projection distance. In FIG. 15, the solid black areas are the light-transmitting portions 51.

Figure 16:
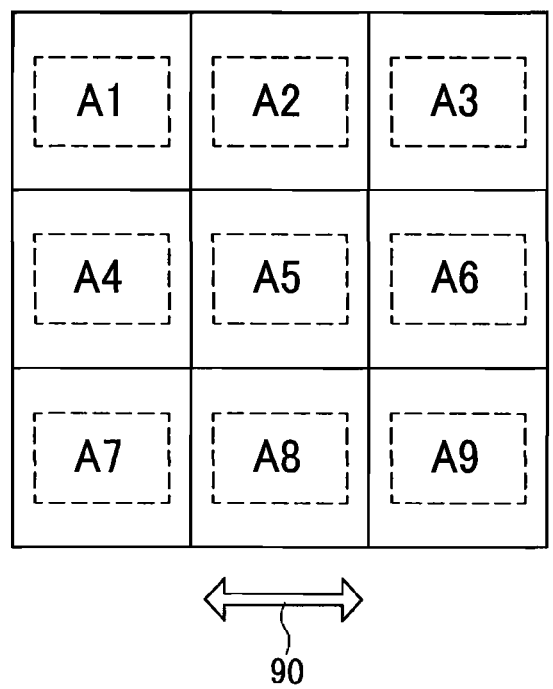
FIG. 16 is a diagram showing an example of the arrangement of a plurality of mask regions in the pattern projection light source according to Embodiment 2 of the present invention.

Although the example in which a plurality of projection optical systems are arranged in a single array in the base line direction 90 of distance measurement has been described above, the present invention is not limited thereto. For example, as shown in FIG. 16, a plurality of projection optical systems may be arranged two-dimensionally in the vertical and horizontal directions. In this case, the variations in density of the patterns depending on the projection distance can be reduced by providing, for example, stripe patterns having different orientations, or different random patterns without periodicity as the patterns of the light-transmitting portions of mask regions A1 to A9.

Furthermore, the present embodiment can be combined with Embodiment 1 shown in FIG. 5. For example, the distance range in which the respective patterns are formed is varied between the mask region A1 to A3 in the top row, the mask regions A4 to A6 in the middle row, and the mask regions A7 to A9 in the bottom row in FIG. 16. This makes it possible to carry out distance measurement over a wide distance range with high accuracy when this pattern projection light source is used as an auxiliary light source of a compound-eye distance measurement apparatus.

The number of mask regions included in the pattern projection light source is not limited to two, three, and nine as shown in this embodiment, and may be a number other than these.

Embodiment 3

In the present embodiment, the mask region of at least one projection optical system of a plurality of projection optical systems is substantially entirely constituted by a light-transmitting portion.

With the pattern projection light sources described in Embodiments 1 and 2, images of the patterns of the light-transmitting portions formed in the mask regions are formed on an object. In other words, of the object surface, a region in which a pattern image of the light-transmitting portions is formed is irradiated with light from a pattern projection light source, and other regions will not irradiated with light from the pattern projection light source at all.

On the other hand, in the case of an object on which surface various shapes or figures are provided, it is possible, in a light environment, to extract the image information necessary for distance measurement by using the contrast resulting from the shapes or figures in an image obtained by imaging that object, and measuring the distance to the object. Accordingly, even if the shapes or figures on an object are not irradiated with light from the pattern projection light source at all, it is possible to perform distance measurement for that object.

In a dark place, however, it is not possible to image the shapes or figures provided on the surface of the object. In this case, if images of the patterns of the light-transmitting portions are formed on the object with the pattern projection light source, then it is possible to extract the image information necessary for distance measurement using the lightness and darkness of that image. On the other hand, if light from the pattern projection light source is not applied onto the object at all, then the image information of the object cannot be extracted from the captured image. Instead, the noise from the imaging element will be included as unnecessary information, which degrades the accuracy of distance measurement based on pattern matching.

In order to alleviate such a problem, light may be applied to the entire object, in addition to projecting the patterns of the light-transmitting portions.

In this embodiment, a pattern that is constituted substantially entirely by a light-transmitting portion is formed in the mask region of at least one of a plurality of projection optical systems. Accordingly, it is possible to illuminate the entire object using this projection optical system, and project an image of a predetermined pattern of the light-transmitting portion on the object using the other projection optical systems.

Figure 17:
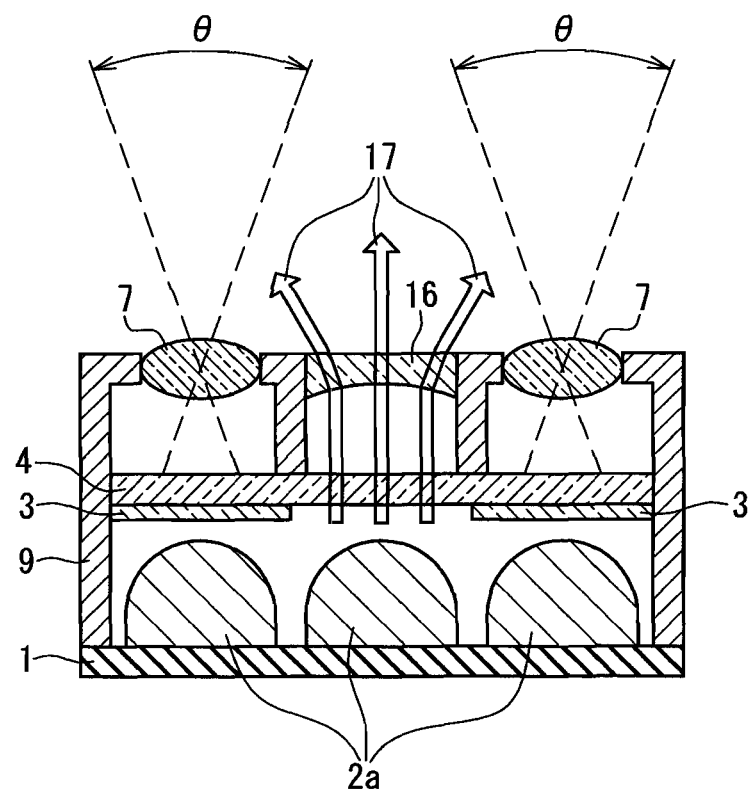
FIG. 17 is a cross-sectional view schematically showing the configuration of a pattern projection light source according to Embodiment 3 of the present invention.

Furthermore, by forming the projection optical system for illuminating the entire object as an illumination optical system as shown in FIG. 17, it is possible to increase the illumination efficiency, and allocate a limited number of projection optical systems between a projection optical system (illumination optical system) for illuminating the entire object, and projection optical systems for projecting an image of a predetermined pattern.

FIG. 17 is a cross-sectional view schematically showing the configuration of an auxiliary light source for distance measurement according to this embodiment. In FIG. 17, numeral 16 denotes a lens constituting an illumination optical system, which expands light beams 17 from an LED 2a at a necessary irradiation angle. Since the lens 16 guides the light beams at a predetermined angle of view, this illumination optical system does not require the scattering member 3. Furthermore, substantially the entire area of a region on a glass substrate 4 that corresponds to the illumination optical system is constituted by a light-transmitting portion. θ is a projection angle of projection optical systems that project an image of a predetermined pattern. Such combined use of the projection optical systems and the illumination optical system makes it possible to provide the object with contrast and illuminance.

Figure 18A:
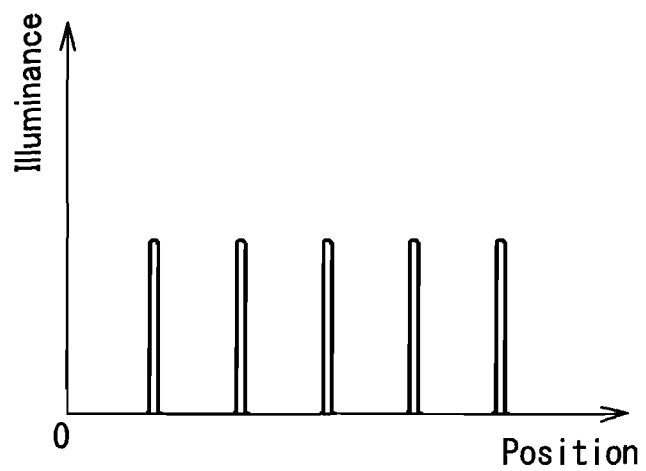
FIG. 18A is a graph showing an example of the illuminance distribution on an object when only projection optical systems are used in the pattern projection light source according to Embodiment 3 of the present invention.

FIG. 18A is a graph showing the illuminance distribution on an object when only the projection optical systems are used in a dark place. In a dark place, the illuminance is zero in the region in which an image of the pattern of the light-transmitting portion is not projected.

Figure 18B:
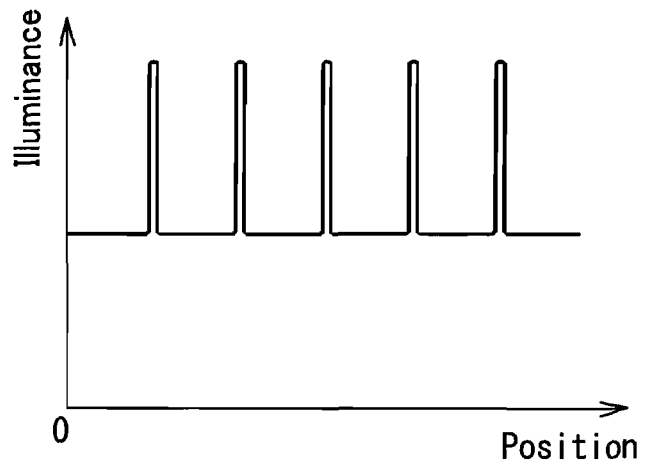
FIG. 18B is a graph showing an example of the illuminance distribution on an object when both projection optical systems and an illumination optical system are used in the pattern projection light source according to Embodiment 3 of the present invention.

On the other hand, the illuminance distribution on the object when the projection optical systems and the illumination optical system are used in combination in a dark place is as shown in FIG. 18B, in which illuminance is provided also in the region in which an image of the pattern of the light-transmitting portion is not projected.

According to this embodiment, in a dark place, illuminance is provided in the entire area of the object using the illumination optical system, thereby obtaining image information with little noise from the contrast of the object itself. However, if the object itself has no contrast, and effective image information therefore cannot be obtained through provision of illuminance, then it is possible to provide a contrast between lightness and darkness by projecting images of the patterns of the light-transmitting portions using the projection optical systems, thereby obtaining the image information necessary for pattern matching. Consequently, it is possible to perform highly accurate distance measurement for any object, regardless of the brightness of the environment or the presence or absence of the contrast of the object itself.

Embodiment 4

Figure 19:
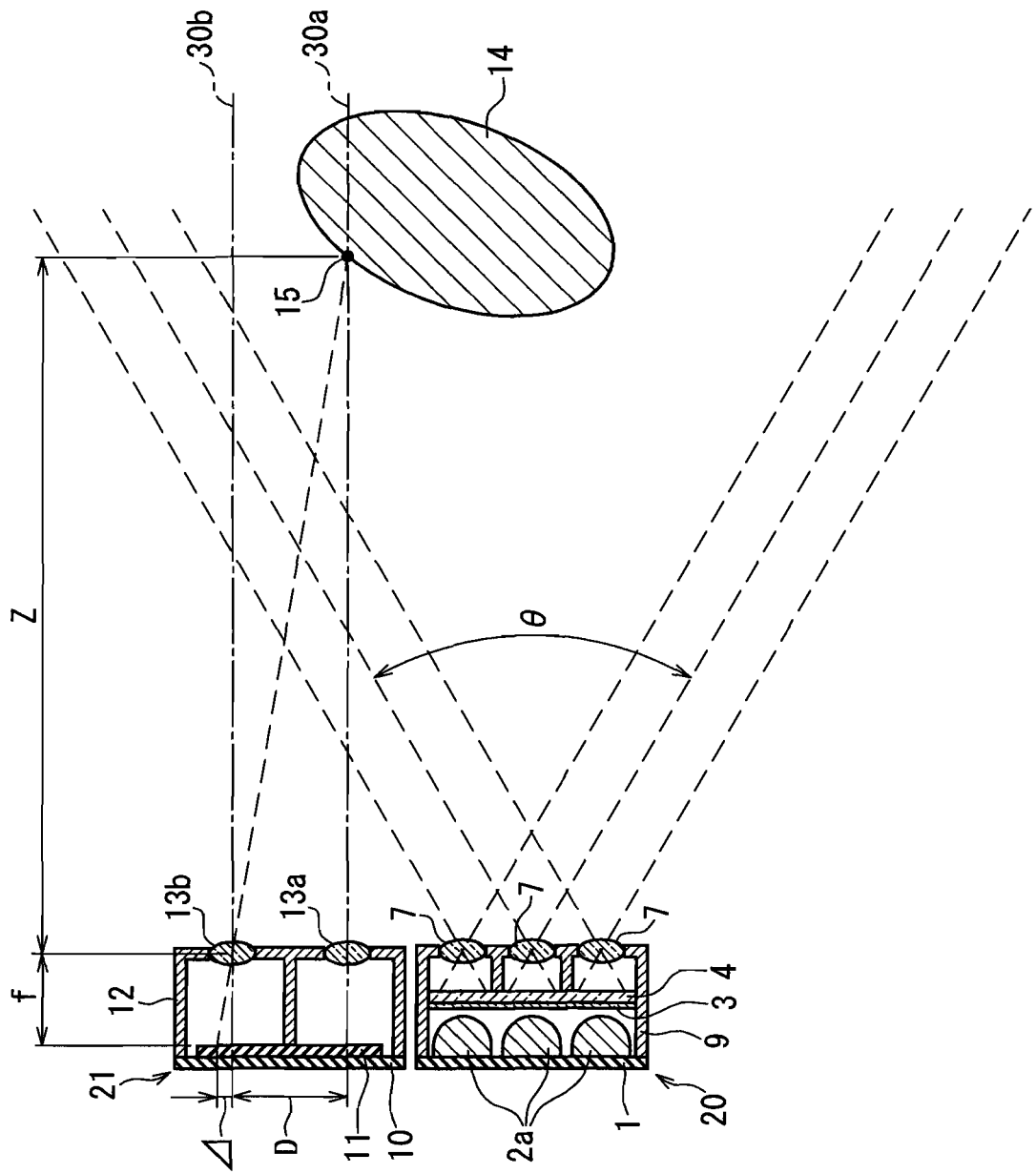
FIG. 19 is a cross-sectional view schematically showing the configuration of a compound-eye distance measurement apparatus according to Embodiment 4 of the present invention.

This embodiment describes a compound-eye distance measurement apparatus using the pattern projection light source of Embodiment 1. FIG. 19 is a cross-sectional view showing the configuration of a compound-eye distance measurement apparatus using the pattern projection light source shown in FIG. 1. In FIG. 19, a pattern projection light source 20 projects, onto a measurement object 14, images of the patterns of light-transmitting portions using a plurality of projection optical systems arranged in an array. θ is a projection angle of the projection optical systems. The measurement object 14 is placed in the projection region of the projection optical systems. Numeral 21 denotes a distance measurement portion having a compound-eye configuration. In the distance measurement portion 21, numeral 10 denotes a substrate, numeral 11 denotes a solid-state imaging element mounted on the substrate 10, numeral 12 denotes a camera lens barrel, numeral 13a denotes an imaging lens of a first imaging optical system, and numeral 13b denotes an imaging lens of a second imaging optical system. The straight line connecting the optical axis 30a of the imaging lens 13a and the optical axis 30b of the imaging lens 13b is referred to as "base line".

A dot 15 on the object 14 is the measurement point. This point is located on the optical axis 30a of the first imaging optical system. The measurement point 15 is imaged, by the first imaging optical system, on the imaging surface of the solid-state imaging element 11 at a position where the optical axis 30a intersects, and imaged, by the second imaging optical system, on the imaging surface of the solid-state imaging element 11 at a position located away from the optical axis 30b by an amount of Δ in the base line direction.

When z represents the distance from the imaging lenses 13a and 13b to the point 15 (object distance), D represents the base line length, which is the distance between the imaging centers of the two imaging lenses 13a and 13b, f represents the focal length of the imaging lenses 13a and 13b (the same for the imaging lenses 13a and 13b), and Δ represents the amount of parallax, the following approximate expression (Formula 2) holds.

$$A \approx D \cdot f/z \qquad \text{Formula 2}$$

The parallax amount Δ can be extracted by performing pattern matching of an image obtained using the first imaging optical system and an image obtained using the second imaging optical system. Accordingly, it is possible to extract the distance z to the point 15 by modifying Formula 2.

Although a compound-eye distance measurement apparatus using the pattern projection light source of FIG. 1 as the pattern projection light source is shown in FIG. 19, any of the above-described pattern projection light sources may be used.

Each of the above-described embodiments is intended merely to clarify the technical content of the present invention. The present invention is not to be construed as limited to these specific examples, but is to be construed in a broad sense, and may be practiced with various modifications within the spirit and the scope of the claims.

INDUSTRIAL APPLICABILITY

The pattern projection light source according to the present invention is capable of projecting a clear image of the pattern of light-transmitting portion over a wide distance range, and thus can be used, for example, for the autofocus system of imaging apparatuses utilizing the contrast of a projected pattern image, in addition to being used for an auxiliary light source of the compound-eye distance measurement apparatus described above, although there is no particular limitation with respect to the field of application.

Furthermore, the compound-eye distance measurement apparatus according to the present invention is useful, for example, as a distance measurement apparatus for vehicles, surveillance cameras, three-dimensional shape measurement, and so on, although there is no particular limitation with respect to the field of application.

The invention claimed is:

1. A pattern projection light source comprising:
  a light source; and
  a plurality of projection optical systems,
  wherein each of the plurality of projection optical systems comprises a mask region and a lens in this order from the light source side,
  each of the mask regions includes a light-transmitting portion that is formed in a predetermined pattern and transmits light from the light source therethrough each of the lenses forms an image of the predetermined pattern of the light-transmitting portion at a predetermined distance, and
  the plurality of projection optical systems are arranged so that optical axes of the projection optical systems are parallel to each other, and
  wherein a region in which images of the predetermined patterns of the light-transmitting portions overlap with each other is formed on a projection surface located at a predetermined distance.

2. The pattern projection light source according to claim 1, wherein the plurality of lenses are arranged in an array, and are molded integrally.

3. The pattern projection light source according to claim 1, wherein at least two lenses of the projection optical systems each form an image of the predetermined pattern at a different distance from each other.

4. The pattern projection light source according to claim 1, wherein the light-transmitting portions are formed in patterns that are different from each other in at least two of the mask regions.

5. The pattern projection light source according to claim 4, wherein each of the patterns that are different from each other is in the form of a stripe, and the orientations of the stripes are different from each other.

6. The pattern projection light source according to claim 4, wherein the patterns that are different from each other are random patterns without periodicity.

7. The pattern projection light source according to claim 1, wherein a pattern that is substantially entirely constituted by a light-transmitting portion is formed in at least one of the mask regions.

8. A compound-eye distance measurement apparatus comprising:
  a compound-eye distance measurement portion that measures the distance to an object based on the parallax between a plurality of imaging optical systems; and
  the pattern projection light source according to claim 1.

9. The pattern projection light source according to claim 1, wherein gradations of illuminance are increased in the region in which the images of the predetermined patterns of the light-transmitting portions are overlapped with each other.

10. The pattern projection light source according to claim 1, wherein the mask region is placed on each of the optical axes of the plurality of projection optical systems.

11. A pattern projection light source comprising:
  a light source;
  a first projection optical system that comprises a first mask region and a first lens in this order from the light source side, wherein the first mask region is disposed at a first position and includes a light-transmitting portion that is formed in a first pattern and transmits light from the light source therethrough, and the first lens forms an image of the first pattern at a predetermined distance; and
  a second projection optical system that comprises a second mask region and a second lens in this order from the light source side, wherein the second mask region is disposed at a second position which is different from the first position and includes a light-transmitting portion that is formed in a second pattern and transmits light from the light source therethrough, and the second lens forms an image of the second pattern at a predetermined distance,
  wherein a region in which the image of the first pattern and the image of the second pattern overlap with each other is formed on a projection surface located at a predetermined distance, and
  wherein the first projection optical system and the second projection optical system are arranged so that optical axes of the first projection optical system and the second projection optical system are parallel to each other.

12. The pattern projection light source according to claim 11, wherein the first mask region is placed on the optical axis of the first projection optical system, and the second mask region is placed on the optical axis of the second projection optical system.

* * * * *